(12) United States Patent
Yamasaki

(10) Patent No.: US 10,259,063 B2
(45) Date of Patent: Apr. 16, 2019

(54) ROTARY TABLE APPARATUS AND ELECTRIC DISCHARGE MACHINE HAVING THE SAME

(71) Applicant: FANUC Corporation, Yamanashi (JP)

(72) Inventor: Mizuho Yamasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 310 days.

(21) Appl. No.: 15/212,496

(22) Filed: Jul. 18, 2016

(65) Prior Publication Data

US 2017/0021439 A1   Jan. 26, 2017

(30) Foreign Application Priority Data

Jul. 23, 2015 (JP) ................... 2015-145574

(51) Int. Cl.
*B23H 11/00* (2006.01)
*B23Q 1/00* (2006.01)

(52) U.S. Cl.
CPC ............. *B23H 11/003* (2013.01); *B23Q 1/00* (2013.01)

(58) Field of Classification Search
CPC ................................ B23H 11/003; B23Q 1/00
See application file for complete search history.

(56) References Cited

U.S. PATENT DOCUMENTS

| | | | |
|---|---|---|---|
| 3,461,059 A * | 8/1969 | Krueger | B23H 11/003 204/297.09 |
| 3,639,225 A * | 2/1972 | Malkowski | B23H 7/26 204/212 |
| 3,664,947 A * | 5/1972 | Bass | B23H 11/003 204/224 M |
| 4,841,126 A * | 6/1989 | Graeber | B23H 7/02 219/69.17 |
| 4,960,971 A * | 10/1990 | Kawanabe | B23H 7/02 219/69.12 |
| 5,450,867 A | 9/1995 | Galuszka | |
| 5,498,163 A * | 3/1996 | Takamura | B25J 19/0029 439/13 |
| 5,878,633 A | 3/1999 | Grund et al. | |
| 6,626,736 B2 * | 9/2003 | Tsujimura | B24B 21/04 451/10 |

(Continued)

FOREIGN PATENT DOCUMENTS

| | | |
|---|---|---|
| CN | 202798271 U | 3/2013 |
| CN | 203674678 U | 6/2014 |

(Continued)

OTHER PUBLICATIONS

Office Action in CN Application No. 201610585860.5, dated Apr. 20, 2018, 15pp.

(Continued)

*Primary Examiner* — Geoffrey S Evans
(74) *Attorney, Agent, or Firm* — Hauptman Ham, LLP

(57) ABSTRACT

A rotary table apparatus includes: a rotary table casing; a face plate which is pivotally supported by the rotary table casing and which can freely rotate; and a joint and a free tube into which a power cable is inserted, the power cable supplying power to rotate the face plate, and an adaptor whose mounting direction with respect to the rotary table casing can be changed and which can be attached to and detached from the rotary table casing is placed between the rotary table casing and the joint.

5 Claims, 4 Drawing Sheets

(56) References Cited

U.S. PATENT DOCUMENTS

| | | | | |
|---|---|---|---|---|
| 6,651,534 | B1* | 11/2003 | Sakamaki | B23Q 1/52 |
| | | | | 318/561 |
| 2002/0148814 | A1* | 10/2002 | Ishiwata | B23H 1/00 |
| | | | | 219/69.2 |
| 2003/0102287 | A1* | 6/2003 | Katsumata | B23H 1/00 |
| | | | | 219/69.11 |
| 2003/0129857 | A1* | 7/2003 | Welch | H01R 39/646 |
| | | | | 439/13 |
| 2005/0254914 | A1 | 11/2005 | Kato | |
| 2006/0022456 | A1* | 2/2006 | Hull | F16L 11/1185 |
| | | | | 285/179 |
| 2008/0047120 | A1* | 2/2008 | Soroka | B23Q 1/01 |
| | | | | 29/27 C |
| 2010/0089201 | A1 | 4/2010 | Nakamura | |
| 2015/0090769 | A1 | 4/2015 | Furuta et al. | |

FOREIGN PATENT DOCUMENTS

| | | | |
|---|---|---|---|
| EP | 1591194 | A2 | 11/2005 |
| GB | 2274611 | A | 8/1994 |
| JP | 2-130731 | U | 10/1990 |
| JP | 9-290336 | A | 11/1997 |
| JP | 11-226828 | A | 8/1999 |
| JP | 2005-118915 | A * | 5/2005 |
| JP | 2008-119793 | A | 5/2008 |
| JP | 2009-6405 | A | 1/2009 |
| KR | 2000-0023893 | A | 5/2000 |
| TW | 200408492 | A | 6/2004 |

OTHER PUBLICATIONS

Office Action in KR Application No. 10-2016-0091843, dated May 15, 2018, 8pp.
Office Action in JP Application No. 2015-145574 dated Dec. 13, 2016.
Extended European Search Report in EP Application No. 16178508.4, dated Nov. 7, 2016.
Office Action in JP Application No. 2015-145574, dated Sep. 6, 2016.

* cited by examiner

ROTARY TABLE APPARATUS AND ELECTRIC DISCHARGE MACHINE HAVING THE SAME

RELATED APPLICATIONS

The present application claims priority to Japanese Application Number 2015-145574, filed Jul. 23, 2015, the disclosure of which is hereby incorporated by reference herein in its entirety.

BACKGROUND OF THE INVENTION

1. Field of the Invention

The present invention relates to a rotary table apparatus and an electric discharge machine having the same.

2. Description of the Related Art

As shown in FIG. 1, a bearing (not shown) is mounted in a rotary table apparatus 1 with reference to a rotary table casing 2, and a face plate 3 is mounted on an inner wheel of the bearing (not shown). The face plate 3 can freely rotate with respect to the rotary table casing 2. A cable-insertion hole 4 for driving a motor is formed in an upper surface (or side surface) of the rotary table casing 2. Joints 5 are mounted directly on the cable-insertion hole 4 to close the hole 4. Free tubes 6 are inserted into the joints 5 respectively. By inserting motor-driving cables (not shown) into the joints 5 and the free tubes 6, it is possible to supply motor-driving electric power to the rotary table apparatus 1 from outside thereof while keeping waterproof of the rotary table apparatus 1 (JP 2008-119793 A).

In an electric discharge machine shown in FIG. 2, the rotary table apparatus 1 is placed on a left work table 7 of a machining tank 20, and the free tubes 6 are placed along an edge of the machining tank 20. In this case, the free tubes 6 and a discharging cable 11 connected to an upper guide 10 do not come into contact with each other.

In an electric discharge machine shown in FIG. 3, the rotary table apparatus 1 is placed on a right work table 8 of the machining tank 20. In this case, since the joints 5 are oriented to a deep side of the machining tank 20, handling of the free tubes 6 become more complicated as compared with FIG. 2. Further, there is a possibility that the free tubes 6 come into contact with the discharging cable 11, the discharging cable 11 may be damaged or cut, and there is a high possibility that the rotary table apparatus 1 receives influence of noise during machining and discharging operations. If a configuration is changed such that the orientation of the joints 5 is rotated and the free tubes 6 are placed in front of the machining tank 20, contact with respect to the discharging cable can be avoided. However, to remove or detach the joints 5, a specialized tool is required in many cases, and if the joints 5 are erroneously fixed, waterproof of the joints 5 may be deteriorated. Therefore, this configuration is not preferable for a general operator.

Further, according to a configuration that the joint 5 is directly mounted on the rotary table casing 2 shown in FIG. 1, there is a problem that the cable-insertion hole 4 cannot be made greater than the joints 5 in size due to the structure of the joints 5. That is, when a connector mounted on a terminal of the motor-driving cable (not shown) is larger than the cable-insertion hole 4, since the cable cannot be inserted into the cable-insertion hole 4, it is necessary to mount the connector on the cable terminal after only the cable is inserted into the cable-insertion hole 4, and assembling efficiency of the rotary table apparatus 1 is poor.

If the joints 5 are made larger, this problem can be solved. However, since the free tubes 6 also become thick in proportion to the joints 5, costs of parts are increased. If the free tubes 6 are made extremely larger with respect to a diameter of the cables inserted into the free tubes 6, the cables rub in the free tubes 6 and may be damaged. Further, also when the rotary table apparatus 1 is fixed to a table in the machining tank 20, since the free tubes 6 are thick, handling thereof is deteriorated, and it becomes difficult to fix the rotary table apparatus 1 along the machining tank 20.

SUMMARY OF THE INVENTION

Hence, in view of the problems of the conventional technique, the present invention provides a rotary table apparatus characterized in that a part is added between a rotary table casing and joints and a mounting direction of free tubes with respect to the rotary table can be changed, and provides an electric discharge machine having the above-described rotary table apparatus.

The rotary table apparatus used for the electric discharge machine according to the present invention is placed on a work table existing in a machining tank which is filled with machining liquid, a workpiece is fixed to the face plate of the rotary table apparatus and the rotary table apparatus is used. When the rotary table apparatus is placed on the work table, it is necessary to take, into account, not only a size of the workpiece, but also handling of the cable emerging from the rotary table apparatus, and positional relations with respect to the discharging cable. The present invention is characterized in that it is possible to easily change the handling of the cable emerging from the rotary table apparatus only by adding one part to the rotary table apparatus, and labor of producing steps can be simplified.

A rotary table apparatus according to the present invention includes: a rotary table casing; a face plate which is pivotally supported by the rotary table casing and which can freely rotate; and a joint and a free tube into which a power cable is inserted, the power cable supplying power to rotate the face plate, wherein an adaptor whose mounting direction with respect to the rotary table casing can be changed and which can be attached to and detached from the rotary table casing is placed between the rotary table casing and the joint. Here, the adaptor and the joint may integrally be formed together.

In addition, in an electric discharge machine according to the present invention, the rotary table apparatus is used as a rotary table apparatus on which a workpiece is mounted, and the electric discharge machine includes a controller which controls the rotary table apparatus and which carries out an electric discharge machining operation.

The present invention can provide a rotary table apparatus characterized in that a mounting direction of a free tube with respect to the rotary table can be changed by adding a part between a rotary table casing and joints, and provide an electric discharge machine having the above-described rotary table apparatus.

BRIEF DESCRIPTION OF THE DRAWINGS

The above-described and other objects and features of the present invention will become apparent from the following description of an embodiment with reference to the attached drawings, wherein.

DETAILED DESCRIPTION OF THE PREFERRED EMBODIMENTS

An embodiment of the present invention will be described together with the drawings.

Figure 4:
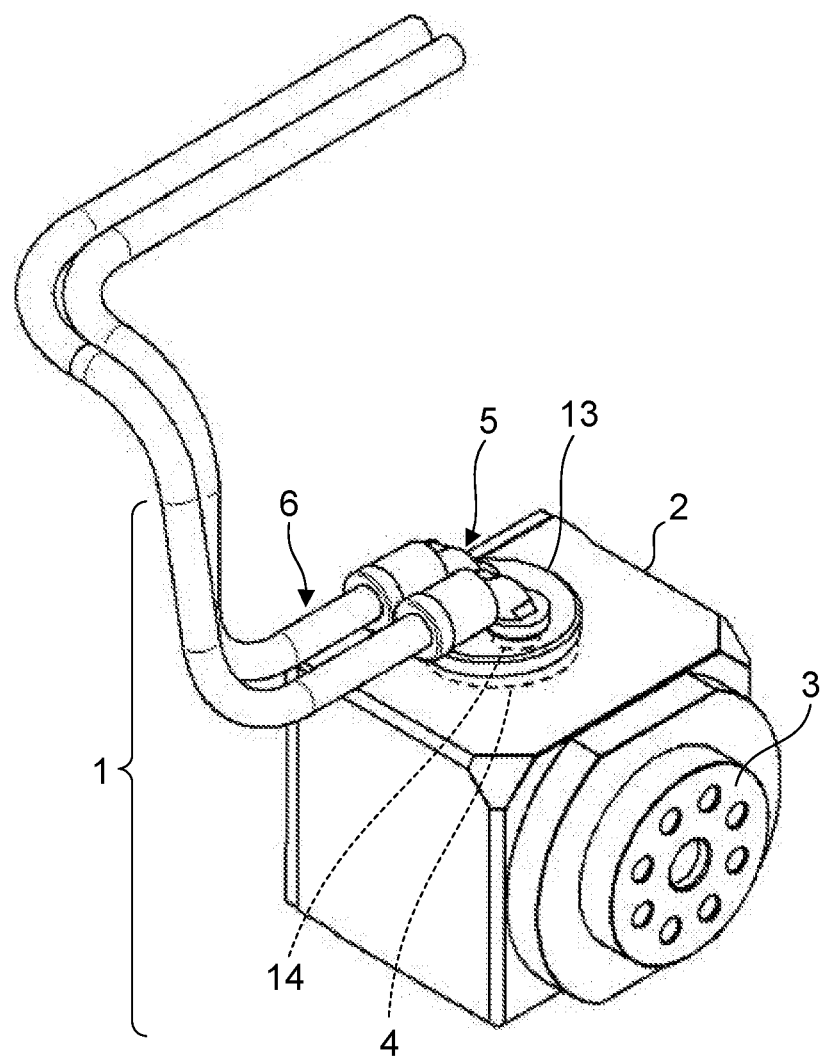
FIG. 4 is a diagram showing a configuration of a rotary table apparatus using an adaptor.

FIG. 4 is a diagram showing a configuration of a rotary table apparatus using an adaptor. A bearing (not shown) is mounted in the rotary table apparatus 1 with reference to a rotary table casing 2, a face plate 3 is mounted on an inner wheel of the bearing (not shown), and the face plate 3 can freely rotate with respect to the rotary table casing 2. As shown in FIG. 4, an adaptor 13 is placed directly on a cable-insertion hole 4 of the rotary table casing 2. A cable-insertion hole 14 is formed also in the adaptor 13. The adaptor 13 is a lid-shaped member, and a plurality of bolt holes (taps) are provided around the adaptor 13. The rotary table casing 2 is provided with a bolt hole. Therefore, the adapter 13 is fixed to the rotary table casing 2 with a bolt or a combination of a bolt and a lock-nut.

Joints 5 are mounted directly on a cable-insertion hole 4 of the adaptor 13, and free tubes 6 are inserted into the joints 5. Motor-driving cables are inserted into the adaptor 13, the joint 5 and the free tubes 6. According to this, it is possible to supply motor-driving electric power to the rotary table apparatus 1 while keeping waterproof of the rotary table apparatus 1.

Figure 5:
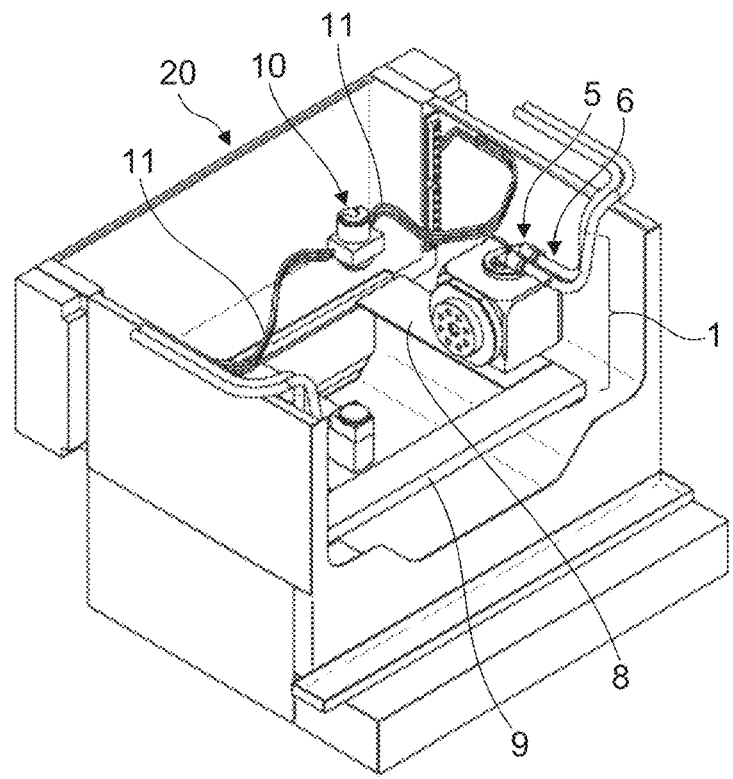
FIG. 5 is a schematic diagram showing that the rotary table apparatus (orientation of joints is changed) is placed on a right table in the machining tank of the electric discharge machine.

Since the adaptor 13 has such a structure that it can easily be attached to and detached from the rotary table casing 2, an operator can freely change the orientation of the joints 5. In FIG. 5, the rotary table apparatus 1 in which the orientation of the joints 5 is changed is placed on the right work cable 8 placed in the machining tank 20 of the electric discharge machine, and contact with respect to the discharging cable 11 which is at issue can be avoided.

Figure 1:
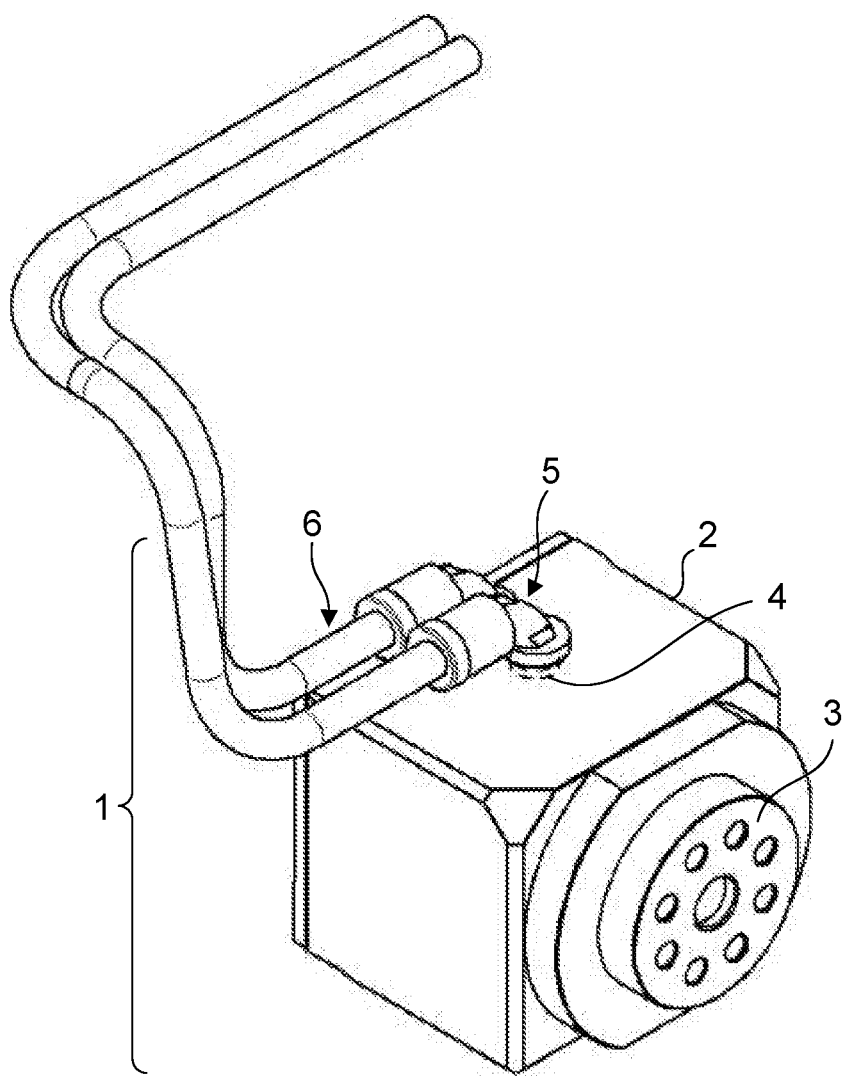
FIG. 1 is a diagram showing a configuration of a rotary table apparatus.
Figure 2:
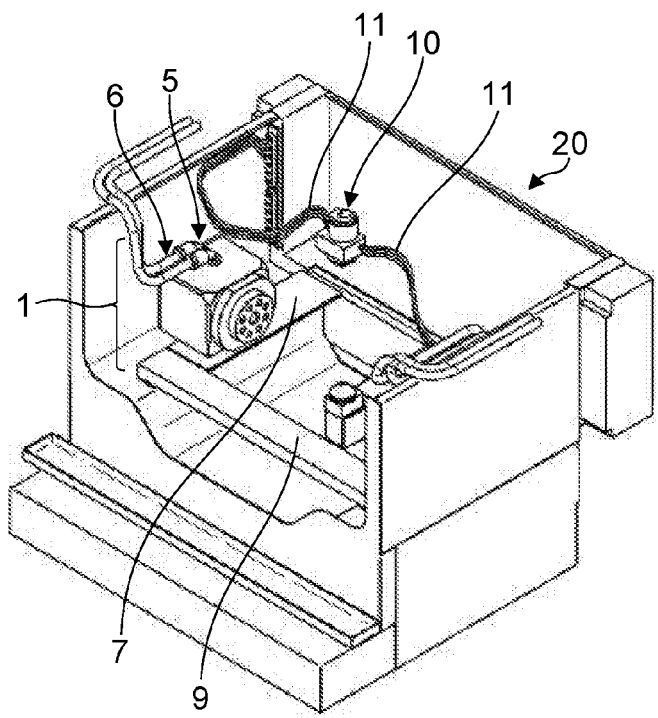
FIG. 2 is a schematic diagram showing that the rotary table apparatus is placed on a left table in a machining tank of an electric discharge machine.
Figure 3:
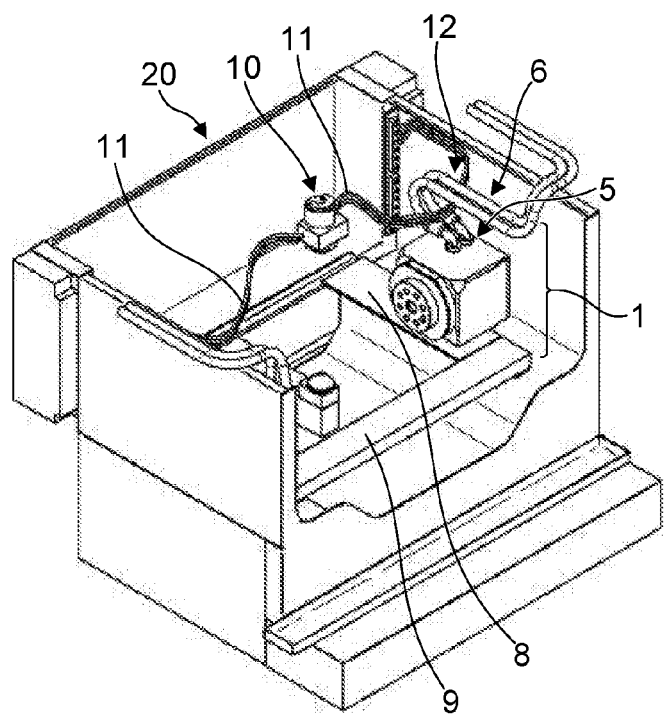
FIG. 3 is a schematic diagram showing that the rotary table apparatus is placed on a right table in the machining tank of the electric discharge machine.

Further, since the adaptor 13 is placed directly on the cable-insertion hole 4 of the rotary table casing 2, the cable-insertion hole 4 can be made larger as compared with a case where the joints 5 are directly placed on the rotary table casing 2 as shown in FIG. 1. According to this, the rotary table apparatus 1 can be assembled in a state where the connector is mounted on a terminal of the motor-driving cable. Hence, an assembling operation of the rotary table apparatus 1 can efficiently be carried out. Although two joints 5 are combined with one adaptor 13 in the drawings, this is one example. The adaptor 13 and the joints 5 may integrally be formed together instead of the divided structure.

Figure 6:
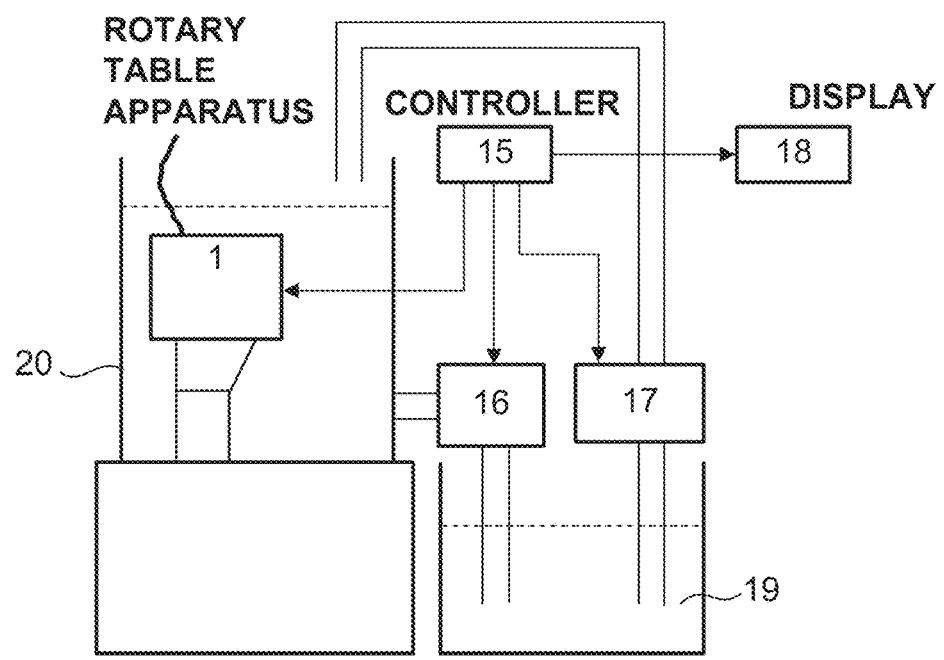
FIG. 6 is a block diagram of a wire cut electric discharge machine provided with the rotary table apparatus.

FIG. 6 is a block diagram of a wire cut electric discharge machine provided with the rotary table apparatus 1. Machining liquid from a tank 19 is supplied to the machining tank 20. Machining chippings are included in the machining liquid in the machining tank 20. The wire cut electric discharge machine includes means 16 which discharges machining liquid in the machining tank 20, and means 17 which supplies machining liquid into the machining tank 20. A controller 15 can drive and control the means 16 which discharges machining liquid in the machining tank, and the means 17 which supplies machining liquid into the machining tank 20. A display unit 18 can display an operation status of the wire cut electric discharge machine.

Although the embodiment of the present invention has been described above, the invention is not limited to the above-described embodiment, and the invention can be carried out in another embodiment by appropriately changing the former embodiment.

The invention claimed is:

1. A rotary table apparatus comprising:
   a rotary table casing;
   a face plate which is pivotally supported by the rotary table casing so as to be freely rotatable;
   a joint and a flexible tube into which a power cable is inserted for supplying power to rotate the face plate; and
   an adaptor arranged between the rotary table casing and the joint, wherein
   the adaptor is attachable to and detachable from the rotary table casing in such a manner that the orientation of the attachment of the adaptor relative to the rotary table casing is freely changeable before being fixed.

2. The rotary table apparatus according to claim 1, wherein the adaptor and the joint are integrally formed.

3. An electric discharge machine, wherein the rotary table apparatus according to claim 1 is used as a rotary table apparatus on which a workpiece is mounted, and the electric discharge machine includes a controller which controls the rotary table apparatus for electric discharge machining.

4. The rotary table according to claim 3,
   wherein the electric discharge machine further includes
   a machining tank in which the rotary table casing is installed, and
   a discharging cable disposed in the machining tank for machining the workpiece, and
   wherein the orientation of the attachment of the adaptor relative to the rotary table casing is set depending on a location of the discharging cable relative to the machining tank.

5. The rotary table according to claim 1,
   wherein the orientation of the attachment of the adaptor relative to the rotary table casing is set depending on a location of the attachment of the adaptor relative to an orientation of the joint and the flexible tube extending from the adaptor.

* * * * *